(12) United States Patent
Rathey et al.

(10) Patent No.: US 8,186,608 B2
(45) Date of Patent: May 29, 2012

(54) APPARATUS FOR WETTING A GLASS PANE

(75) Inventors: Markus Rathey, Bad Bellingen (DE); Daniel Utz, Bad Bellingen (DE)

(73) Assignee: A. Raymond et Cie, Grenoble (FR)

( * ) Notice: Subject to any disclaimer, the term of this patent is extended or adjusted under 35 U.S.C. 154(b) by 210 days.

(21) Appl. No.: 12/678,951

(22) PCT Filed: Sep. 26, 2008

(86) PCT No.: PCT/EP2008/008224
§ 371 (c)(1), (2), (4) Date: Mar. 18, 2010

(87) PCT Pub. No.: WO2009/049759
PCT Pub. Date: Apr. 23, 2009

(65) Prior Publication Data
US 2010/0237171 A1    Sep. 23, 2010

(30) Foreign Application Priority Data
Oct. 17, 2007   (DE) .......................... 10 2007 049 623

(51) Int. Cl.
*B05B 1/10* (2006.01)
(52) U.S. Cl. ................ 239/284.1; 239/587.4; 239/589.1
(58) Field of Classification Search ............... 239/284.1, 239/284.2, 587.3, 587.4, 598.1
See application file for complete search history.

(56) References Cited

U.S. PATENT DOCUMENTS

| 2006/0043110 A1 | 3/2006 | Miyauchi |
| 2006/0226266 A1 | 10/2006 | Russell et al. |
| 2006/0278738 A1 | 12/2006 | Steerman |

FOREIGN PATENT DOCUMENTS

| DE | 7113796U1 U1 | 7/1971 |
| DE | 8905635U1 U1 | 6/1989 |
| EP | 1629896 A1 | 3/2006 |
| WO | WO2007/091249 A2 | 8/2007 |
| WO | WO20071139891 A1 | 12/2007 |

OTHER PUBLICATIONS

The International Search Report published Apr. 23, 2009 as WO2009/049759A1 in parent International Application No. PCT/EP2008/008224.

*Primary Examiner* — Christopher Kim
(74) *Attorney, Agent, or Firm* — Faegre Baker Daniels

(57) ABSTRACT

In an apparatus for wetting a glass pane, in particular a glass pane of a motor vehicle, a spherical body (15) which supports a nozzle body (20) is inserted into an accommodation space (10) which is formed in a bearing head (9) of an insert body (1). The accommodation space (10) exhibits the spherical body (15) together with resistance projections (12) which fix an annular shoulder and also serve to fluidically stabilize a liquid fluid, which flows into a flow expansion space as a subregion of the accommodation space (10), in the form of, for example, wash water. An oscillating fan-like stream can be reliably generated as a result.

4 Claims, 3 Drawing Sheets

APPARATUS FOR WETTING A GLASS PANE

CROSS-REFERENCE TO RELATED APPLICATION

This application is a U.S. National Phase Patent Application based on International Application Serial No. PCT/EP2008/008224 filed Sep. 26, 2008, the disclosure of which is hereby explicitly incorporated by reference herein.

BACKGROUND OF THE INVENTION

1. Field of the Invention

The invention is directed to an apparatus for wetting a window pane, particularly a window pane of a motor vehicle.

2. Description of the Related Art

One known apparatus is DE 89 05 635 U1. The prior apparatus comprises an insert body to which at least one fluid line can be connected and which has a sleeve-like bearing head. Also present is a spherical body which is inserted into the bearing head and is rotatably and pivotably held therein in spaced relation to a back wall, resulting in the formation of a flow expansion chamber. The spherical body carries a nozzle arrangement through which the window pane can be wetted with a liquid fluid passing through said arrangement.

SUMMARY OF THE INVENTION

The present invention provides an apparatus that serves to generate an oscillating fan jet whose characteristic exhibits stable flow dynamics and that can be adjusted over a relatively large angular range.

By virtue of the fact that in the apparatus according to the invention a number of resistance projections are disposed in the flow expansion chamber, on the one hand, the spherical body, together with the annular shoulder, is maintained at a given radial distance from the inner wall of the bearing head within a relatively large area, with the result that the risk of seizing is reduced due to the relatively small area of contact of the spherical body with the inner wall of the bearing head. In addition, the resistance projections function as fluid-dynamic turbulators, which homogenize the flow in the flow expansion chamber before it enters the antechamber of the nozzle body, thus establishing stable flow-dynamics conditions for the generation of the oscillating fan jet.

In one form thereof, the present invention provides an apparatus for wetting a window pane, particularly a window pane of a motor vehicle, including an insert body to which at least one fluid line can be connected and which includes a bearing head, and including a spherical body, which can be inserted in the bearing head and is rotatably and pivotably held therein in spaced relation to a back wall, thereby forming a flow expansion chamber, and which carries a nozzle arrangement by means of which the window pane can be wetted, characterized in that the nozzle arrangement includes a nozzle body that is provided with a antechamber and a jet-forming chamber connected to the antechamber and subdivided into a central channel and two lateral arms disposed one on each side of the central channel, in order to generate an oscillating fan jet; in that configured in the spherical body is a nozzle receiving space that extends from a front face transversely through the spherical body and at the back face disposed opposite the front face debouches into the flow expansion chamber; in that the bearing head includes, extending around its periphery, an annular shoulder that is disposed in the region of an open window opening of the bearing head; in that a radial spacing is present between the bearing head and the spherical body on the side of the annular shoulder proximate the back wall; and in that the bearing head includes, disposed in the flow expansion chamber, a number of resistance projections that confront the annular shoulder on the side facing toward the back wall and that bear against the spherical body.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
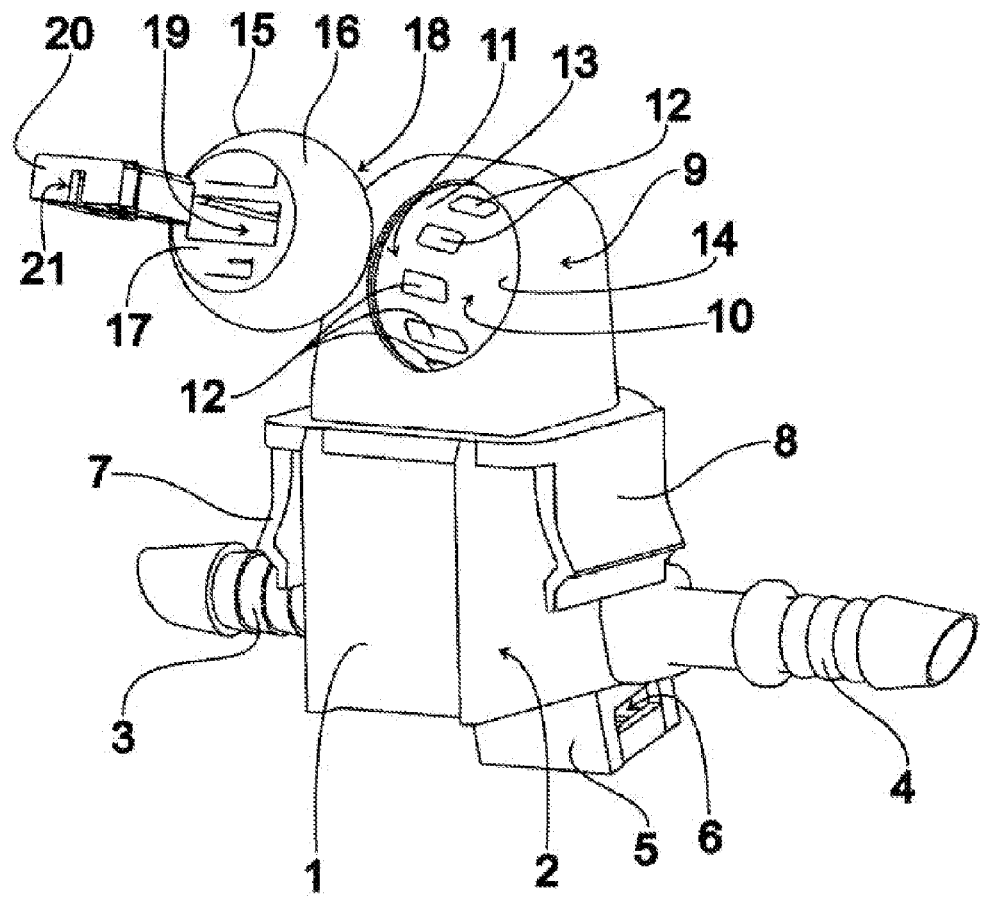
FIG. 1 is an exploded perspective view of an exemplary embodiment of an apparatus according to the invention comprising an insert body, a spherical body and a nozzle body.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is an exploded perspective view of an exemplary embodiment of an apparatus according to the invention, comprising an insert body 1 made of a hard-elastic synthetic material. Said insert body 1 has an approximately cuboid base portion 2, on which connection nozzles 3, 4 are formed respectively on mutually opposite wall sides. Each connection nozzle 3, 4 serves to establish a connection to a fluid line of a fluid line system (not shown in FIG. 1). Also formed on base portion 2 is a valve locking projection 5 that protrudes beyond one end of base portion 2 and is disposed at the back in the view of FIG. 1, and in which a non-return valve assembly (not shown in FIG. 1) can be inserted and which can be fastened in the latching recesses 6 formed in valve locking projection 5. Arranged on base portion 2 at the opposite end from valve locking projection 5, on mutually opposite wall sides, are latching tongues 7, 8, which point toward valve locking projection 5 and are adapted to fix insert body 1 in a support part not shown in FIG. 1.

Insert body 1 is also configured with a dome-like bearing head 9, which is joined to insert body 1 at the opposite end from valve locking projection 5. Bearing head 9 has a receiving space 10 that is closed to the outside except for a circular window opening 11, which faces the viewer in the representation of FIG. 1. Disposed in said receiving space 10 in spaced relation to window opening 11 are a number of resistance projections 12, which are arranged evenly over the circumferential direction on a side wall 13 bounding the receiving space 10, and which extend, as elongate bodies, in a longitudinal direction from window opening 11 to a back wall 14 of bearing head 9 that is disposed opposite window opening 11.

The exemplary embodiment of the inventive apparatus that is depicted in FIG. 1 also comprises a spherical body 15, which is configured on its outer face with a spherical-segment-like jacket surface 16 extending symmetrically on both sides of a great circle. Spherical body 15 also has a planar front face 17 and a back face 18 that is disposed opposite said front face 17, which is toward the viewer in the representation of FIG. 1. Formed in spherical body 15 is a cuboid nozzle receiving space 19 that debouches over its full cross section into front face 17.

Finally, depicted in FIG. 1, as a further element of the inventive apparatus, is a cuboid nozzle body 20 whose dimensions correspond to the dimensions of nozzle receiving space 19, such that said nozzle body 20 can be inserted so far into nozzle receiving space 19 that a discharge slit 21 formed on nozzle body 20 is in the region of front face 17, and nozzle receiving space 19 is filled up completely by nozzle body 20.

Figure 2:
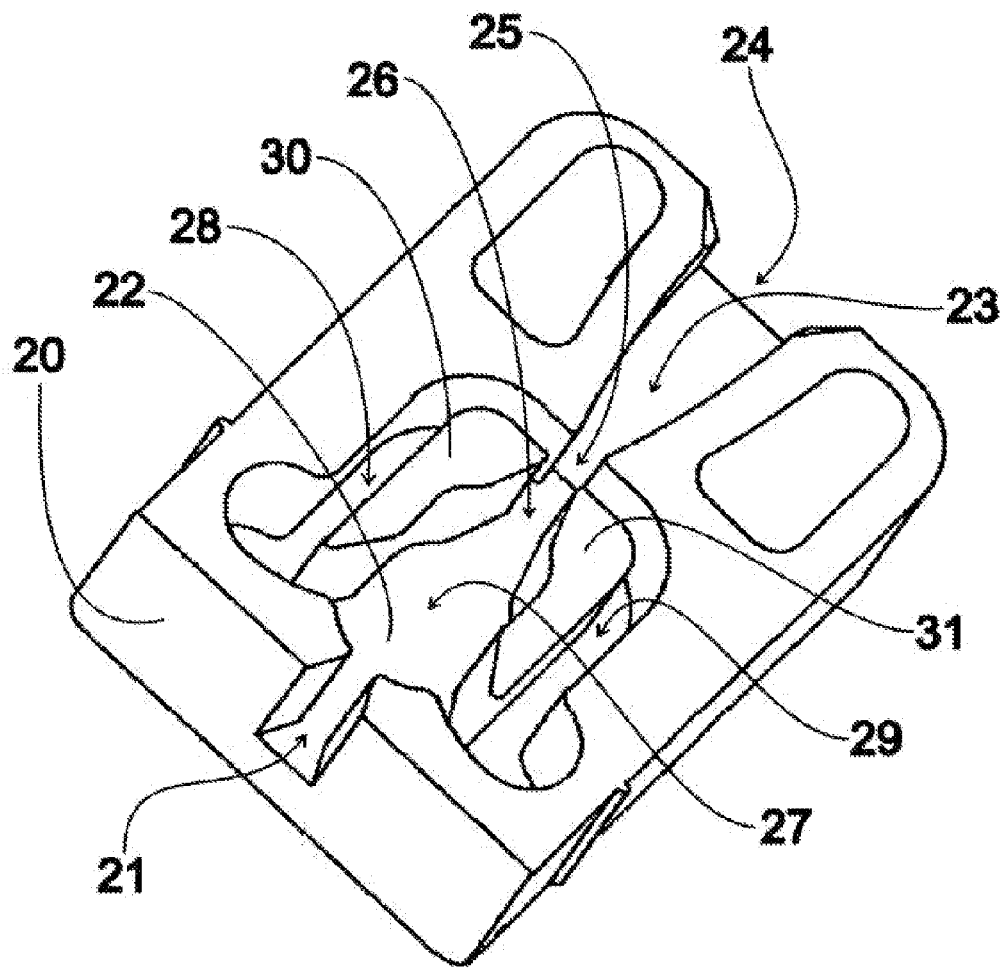
FIG. 2 is a perspective view of the nozzle body from the exemplary embodiment according to FIG. 1.

FIG. 2 is a perspective view of the nozzle body 20 of the exemplary embodiment according to FIG. 1. As can be seen from FIG. 2, nozzle body 20 is configured with a closed top 22 that extends over the entire base area of nozzle body 20. It can be seen from FIG. 2 that nozzle body 20 comprises an antechamber 23 which is disposed opposite discharge slit 21 and which, in this exemplary embodiment, is configured with an inlet opening 24 that is disposed opposite the discharge slit 21 in the longitudinal direction of nozzle body 20 and extends over about one-quarter of the transverse side of nozzle body 20 symmetrically to the central longitudinal axis. Antechamber 23 tapers continuously from inlet opening 24 in the direction of an outlet opening 25 that is disposed opposite inlet opening 24 and establishes fluidic communication between antechamber 23 and a subdivided jet-forming chamber 26 disposed between antechamber 23 and discharge slit 21.

Jet-forming chamber 26 is configured with a central channel 27 extending symmetrically to the central longitudinal axis from outlet opening 25 toward discharge slit 21, and comprises lateral arms 28, 29, which are disposed one on each side of said central channel 27 and which extend, separated from central channel 27 by separation blocks 30, 31, arcuately from outlet opening 25 toward discharge slit 21, and debouch into central channel 27 again in the region of discharge slit 21, each lateral arm 28, 29 having respective outwardly directed convexities in the region where it debouches into central channel 27. Central channel 27 itself widens from outlet opening 25 toward discharge slit 21. By virtue of this configuration of jet-forming chamber 26, when jet-forming chamber 26 is impinged upon by a liquid fluid in a known manner, a fan jet oscillating with a given frequency can be generated by pressure-pulse feedback from the side of central channel 27 closest to discharge slit 21, via lateral arms 28, 29 to the region of central channel 27 near the outlet opening 25, and exits the discharge slit 21 of nozzle body 20. In this exemplary embodiment, the dimension of antechamber 23 in the longitudinal direction of nozzle body 20 is smaller than the dimension of jet-forming chamber 26 in the longitudinal direction.

Figure 3:
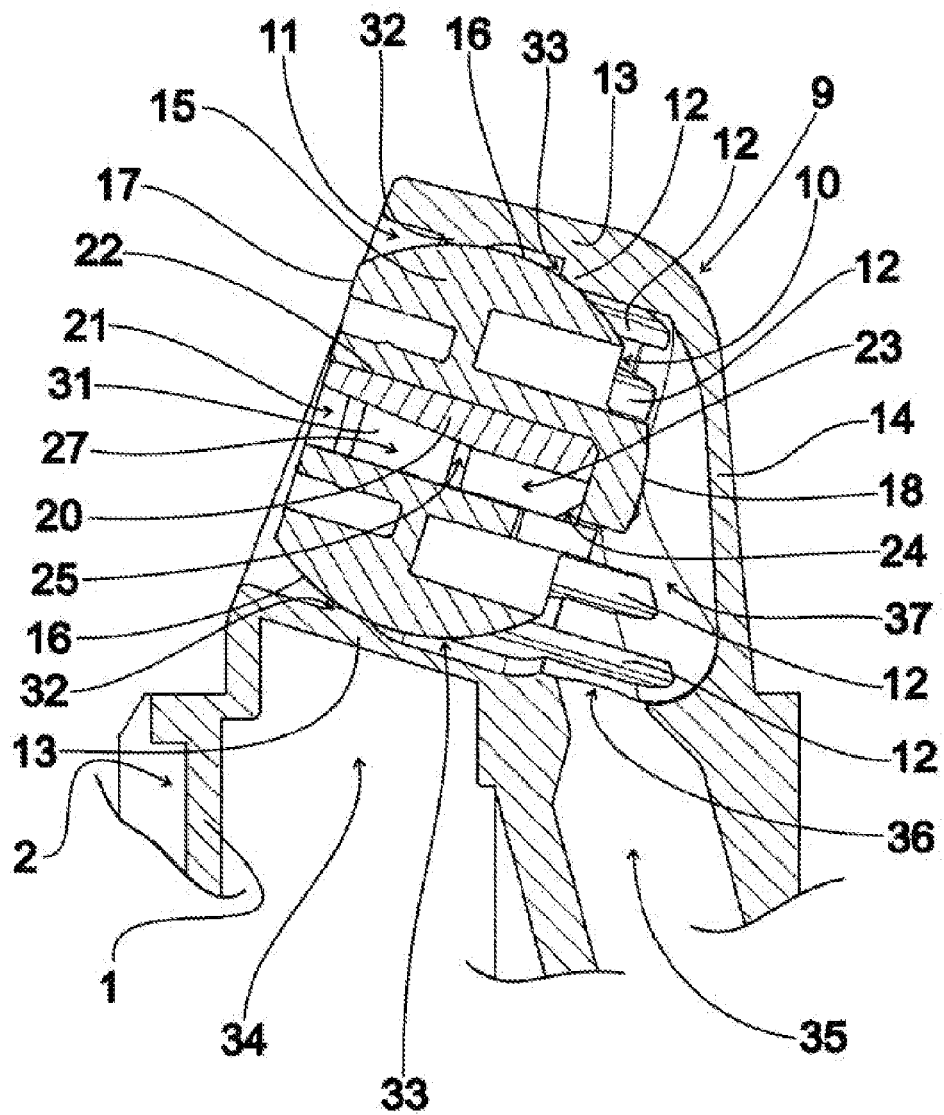
FIG. 3 shows the exemplary embodiment according to FIG. 1 in longitudinal section in the region of a bearing head of the insert body.

FIG. 3 is a longitudinal section of the insert body 1, the spherical body 15 and the nozzle body 20 according to the exemplary embodiment of an apparatus according to the invention described in connection with FIGS. 1 and 2, shown fitted together, in the region of bearing head 9. It can be seen from FIG. 3 that receiving space 10 is provided on its side facing window opening 11 with a circumferential annular shoulder 32, against which the jacket surface 16 of spherical body 15 rests in a region forward of the center of spherical body 15. Side wall 13 is set back radially outward on the side of annular shoulder 32 that faces back wall 14, such that a free space 33 is formed between side wall 13 and jacket surface 16. It will also be noted, in the representation of FIG. 3, that resistance projections 12 extending as elongate bodies from the back face 18 of spherical body 15 to the back wall 14 of bearing head 9 rest against the jacket surface 16 of spherical body 15 on the side facing away from window opening 11, causing spherical body 15 to be rotatably and pivotably held in bearing head 9.

It will also be appreciated from FIG. 3 that insert body 1 is configured with a heater receiving space 34, which extends through base portion 2 and terminates at side wall 13, which latter bounds receiving space 10 and is configured in this region with a relatively small material thickness. A heating element (not shown in FIG. 3) can be placed in heater receiving space 34 in order to heat said receiving space 10 and particularly a liquid fluid, for example wash water, that is present in receiving space 10, to prevent freezing.

Configured adjacent to heater receiving space 34 is a fluid inlet space 35, which is adjacent to back wall 14 and extends from the valve locking projection 5 depicted in FIG. 1 into base portion 2, and which communicates, via a communication opening 36 formed in a narrowed debouchment region, with a flow expansion chamber 37 that is formed between the back wall 14 of bearing head 9 and the back face 18 of spherical body 15. In this arrangement, nozzle body 20 is offset by an angle of more than 45 degrees from the longitudinal direction of fluid inlet space 35, thus, in combination with an offset of inlet opening 24 transversely to communication opening 36, effecting a diversion of the fluid that further brings about further homogenization of the flow. The resistance projections 12 are disposed in flow expansion chamber 37, as the fluidically active region of receiving space 10, and swirl the fluid flowing in from fluid inlet space 35, thereby inducing a certain homogenization of the flow in the flow expansion chamber 37, before the fluid passes through the inlet opening 24 of nozzle body 20 and on into the antechamber 23 thereof.

This homogenization of the flow of fluid as far upstream as in the flow expansion chamber 37 serves to create the stable fluidic parameters at outlet opening 25 that are needed for reliably generating an oscillating fan jet in jet-forming chamber 26, while at the same time permitting relatively short construction for the bearing head 9 in the longitudinal direction of nozzle body 20, since the antechamber 23 is relatively short.

In addition, exerting a fluidic influence on the flow in the region of resistance projections 12 ensures the efficient transfer of thermal energy from heater receiving space 24 into receiving space 10, and ultimately into the fluid that is to be kept from freezing.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An apparatus for wetting a window pane of a motor vehicle, comprising:
   an insert body including a bearing head, said insert body connectable to at least one fluid line;
   a spherical body insertable in said bearing head, said spherical body rotatably and pivotably held in said bearing head in spaced relation to a back wall of said bearing head to define a flow expansion chamber, said spherical body including a nozzle arrangement comprising:
   a nozzle receiving space extending from a front face of said spherical body transversely through said spherical body and opening into said flow expansion chamber at a back face of said spherical body disposed opposite said front face;

a nozzle body including an antechamber and a jet-forming chamber connected to said antechamber, said jet-forming chamber subdivided into a central channel and two lateral arms disposed one on each side of said central channel to generate an oscillating fan jet;

an annular shoulder extending around an inner periphery of said bearing head and disposed between an open window opening of said bearing head and said back wall of said bearing head, with a radial spacing present between said bearing head and said spherical body on a side of said annular shoulder facing said back wall;

a plurality of resistance projections disposed in said flow expansion chamber of said bearing head, said resistance projections confronting said annular shoulder on a side facing toward said back wall, said resistance projections bearing against said spherical body.

2. The apparatus of claim 1, wherein said resistance projections are elongate bodies that extend in a longitudinal direction from the back face of said spherical body toward said back wall.

3. The apparatus of claim 1, wherein said nozzle body is oriented at more than about 45 degrees to a longitudinal direction of a fluid inlet space opening into said flow expansion chamber.

4. The apparatus of claim 3, wherein said inlet opening of said nozzle body is offset from a communication opening of said fluid inlet space.

* * * * *